US009582042B2

(12) United States Patent
Seo

(10) Patent No.: US 9,582,042 B2
(45) Date of Patent: Feb. 28, 2017

(54) DAM MEMBER AND DISPLAY APPARATUS INCLUDING THE SAME

(71) Applicant: SAMSUNG DISPLAY CO., LTD., Yongin, Gyeonggi-Do (KR)

(72) Inventor: Gwang Jea Seo, Cheonan-si (KR)

(73) Assignee: Samsung Display Co., Ltd., Yongin-si (KR)

(*) Notice: Subject to any disclaimer, the term of this patent is extended or adjusted under 35 U.S.C. 154(b) by 312 days.

(21) Appl. No.: 14/323,754

(22) Filed: Jul. 3, 2014

(65) Prior Publication Data
US 2015/0237755 A1 Aug. 20, 2015

(30) Foreign Application Priority Data
Feb. 14, 2014 (KR) ........................ 10-2014-0017228

(51) Int. Cl.
G06F 1/16 (2006.01)
H05K 5/00 (2006.01)

(52) U.S. Cl.
CPC ......... *G06F 1/1643* (2013.01); *H05K 5/0017* (2013.01)

(58) Field of Classification Search
CPC .............................. G06F 1/1601; G06F 1/1637
See application file for complete search history.

(56) References Cited

U.S. PATENT DOCUMENTS

| 4,004,388 A | 1/1977 | Stefanik | |
| 2012/0092580 A1* | 4/2012 | Dighde | G06F 3/0412 349/58 |
| 2014/0063433 A1* | 3/2014 | Benson | G02F 1/1341 349/155 |
| 2014/0125911 A1* | 5/2014 | Lee | G02F 1/133308 349/58 |
| 2015/0009176 A1* | 1/2015 | Inata | G06F 3/016 345/174 |
| 2015/0021081 A1* | 1/2015 | Mitarai | H01L 23/15 174/260 |
| 2015/0189717 A1* | 7/2015 | Kuranaga | H01L 51/5246 313/511 |
| 2015/0256658 A1* | 9/2015 | Shin | G06F 1/1637 455/566 |
| 2015/0264163 A1* | 9/2015 | Sato | G06F 1/1637 455/566 |
| 2016/0004275 A1* | 1/2016 | Park | G06F 1/1601 361/749 |
| 2016/0070314 A1* | 3/2016 | Takahashi | G09G 5/003 361/679.21 |
| 2016/0113106 A1* | 4/2016 | Kim | H05K 1/028 361/749 |

FOREIGN PATENT DOCUMENTS

| JP | 2005-100685 A | 4/2005 |
| KR | 10-2011-0018194 A | 2/2011 |
| KR | 10-2011-0124534 A | 11/2011 |

* cited by examiner

Primary Examiner — Anthony Q Edwards
(74) Attorney, Agent, or Firm — Lewis Roca Rothgerber Christie LLP

(57) ABSTRACT

A dam member and display apparatus including the same. According to an embodiment of the present invention, a dam member includes an interception block having a long side and a short side, and a cover sheet attached to an upper surface or a lower surface of the interception block, wherein the cover sheet includes a surface extending in a direction of the long side of the interception block.

17 Claims, 28 Drawing Sheets

100

DAM MEMBER AND DISPLAY APPARATUS INCLUDING THE SAME

CROSS-REFERENCE TO RELATED APPLICATION

This application claims priority to and the benefit of Korean Patent Application No. 10-2014-0017228, filed on Feb. 14, 2014, in the Korean Intellectual Property Office, the disclosure of which is incorporated herein in its entirety by reference.

BACKGROUND

1. Field

The following description relates to a dam member and a display apparatus including the same.

2. Description of the Related Art

With the development of information age, various display panels, such as an organic light emitting display panel (OLED panel), a liquid crystal display panel (LCD panel), an electrophoretic display panel (EPD panel), or an electrowetting display panel (EWD panel), have been applied to display devices.

Here, a display device may include the above-described display panel and a window, and the window may be bonded to the display panel through the medium of a bonding member, such as resin. However, since the resin itself has fluidity, an overflow of the resin may occur due to insufficient curing or excessive spreading of the resin.

SUMMARY

Accordingly, aspects of embodiments of the present invention are directed toward a dam member and a display apparatus including the same, which can effectively prevent or reduce resin provided between a window and a display panel from overflowing.

Another aspects of embodiments of the present invention are directed toward a dam member and a display apparatus including the same, which can prevent or reduce inferiority of a display device through preventing or reducing resin from penetrating into a button portion of a window and a circuit region of a display module.

Additional enhancements, subjects, and features of the invention will be set forth in part in the description which follows and in part will become apparent to those having ordinary skill in the art upon examination of the following or may be learned from practice of the invention.

According to an embodiment of the present invention, a dam member includes an interception block having a long side and a short side, an upper surface and a lower surface; and a cover sheet attached to the upper surface or the lower surface of the interception block, the cover sheet may have a surface extending in a direction of the long side of the interception block.

A length of the cover sheet in a direction that is parallel to the direction of the long side of the interception block may be equal to or smaller than a length of the long side of the interception block.

The interception block may further include an adhesive member on a surface opposite to a surface to which the cover sheet is attached.

According to another embodiment of the present invention, a display apparatus includes a display module including a display region and a circuit region; a window facing the display module and including a button portion; a bonding member between the display region of the display module and the window and configured to bond the display module and the window to each other; and a dam member along a boundary between the display region and the circuit region to prevent or reduce the bonding member from overflowing (overflowing from) the display region, the dam member may include an interception block configured to prevent or reduce the bonding member from penetrating into the circuit region and a cover sheet configured to prevent or reduce the bonding member from penetrating into the button portion.

The cover sheet may be on an upper surface or a lower surface of the interception block and cover at least a part of the button portion.

The cover sheet may be between the interception block and the display module, and include a surface that projects toward the circuit region.

The projecting surface of the cover sheet may be between the button portion and the circuit region of the display module.

The cover sheet may be attached to the interception block.

The interception block and the cover sheet may be integrated as one body.

The interception block may be between the display module and the window, and along a circumference of a side surface of the bonding member.

The window may include a button driving portion corresponding to the circuit region, the button driving portion is on a lower side of window, and the cover sheet may cover at least a part of the button driving portion.

A surface of the interception block that faces the display module and a surface of the button driving portion that faces the display module may be positioned on a same horizontal line.

The cover sheet may come in contact with a surface of the button driving portion that faces the display module.

The cover sheet may further include a surface that projects toward the circuit region, and the projecting surface and the bottom driving portion may overlap each other at least partly on a same vertical line.

The display apparatus may further include an integrated circuit chip in the circuit region.

The interception block may cover at least a part of the integrated circuit chip.

The display module may include a first substrate and a second substrate, the second substrate corresponds to the display region and is on the first substrate, and the integrated circuit chip may be on the first substrate corresponding to the circuit region.

The display apparatus may further include a connection member having one side connected to the display module.

The cover sheet may cover one side of the connection member.

The display module may include a display panel and a touch panel on the display panel, and one side of the connection member may be connected to the touch panel.

According to the embodiments of the present invention, the dam member and the display apparatus including the same can prevent or reduce the resin from overflowing.

Further, the dam member and the display apparatus including the same can prevent or reduce the resin from penetrating into the button portion of the window.

Other features and aspects will be apparent from the following detailed description, the drawings, and the claims.

BRIEF DESCRIPTION OF THE DRAWINGS

The above and other objects, features and enhancements of the present invention will be more apparent from the following detailed description taken in conjunction with the accompanying drawings, in which.

DETAILED DESCRIPTION

Figure 1:
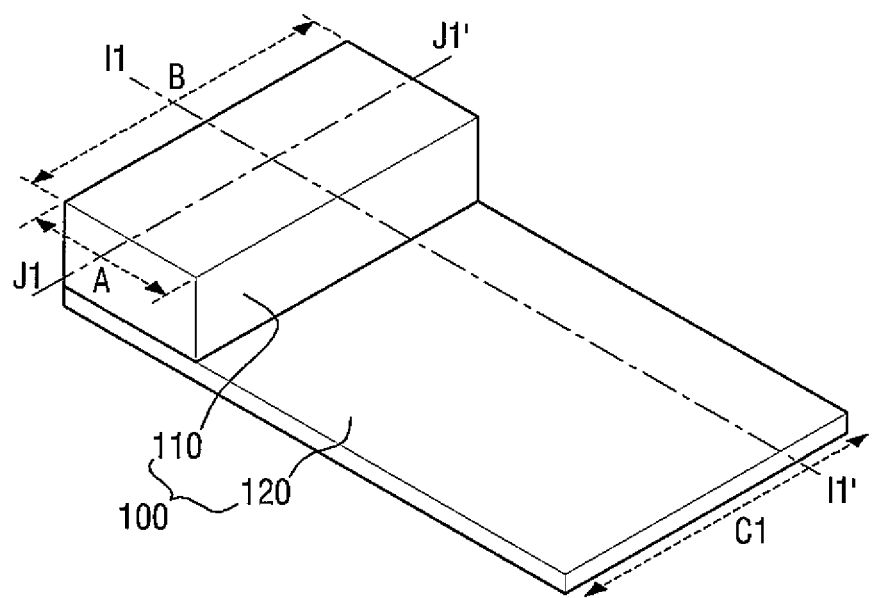
FIG. 1 is a perspective view of a dam member according to an embodiment of the present invention.

The aspects and features of the present invention and methods for achieving the aspects and features will be apparent by referring to the embodiments to be described in more detail with reference to the accompanying drawings. However, the present invention is not limited to the embodiments disclosed hereinafter, but can be implemented in diverse forms. The matters defined in the description, such as the detailed construction or elements, are nothing but specific details provided to assist those of ordinary skill in the art in a comprehensive understanding of the invention, and the present invention is only defined within the scope of the appended claims, and equivalents thereof.

The term "on" that is used to designate that an element is on another element or located on a layer (e.g., a different layer) includes both a case where an element is located directly on another element or a layer, and a case where an element is located on another element via still another element or another layer. In the entire description of the present invention, the same drawing reference numerals are used for the same elements across various figures.

Although the terms "first", "second", and so forth are used to describe diverse constituent elements, such constituent elements are not limited by the terms. The terms are used only to discriminate a constituent element from other constituent elements. Accordingly, in the following description, a first constituent element may be a second constituent element.

Hereinafter, embodiments of the present invention will be described with reference to the accompanying drawings.

Figure 2:
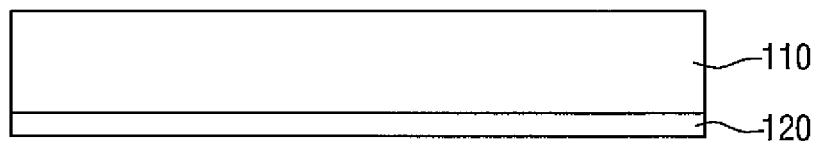
FIG. 2 is a cross-sectional view of the dam member of FIG. 1 taken along the line J1-J1' of FIG. 1.

FIG. 1 is a perspective view of a dam member according to an embodiment of the present invention. FIG. 2 is a cross-sectional view of the dam member of FIG. 1 taken along the line J1-J1' of FIG. 1, and FIG. 3 is a cross-sectional view of the dam member of FIG. 1 taken along the line I1-I1' of FIG. 1.

Figure 3:
FIG. 3 is a cross-sectional view of the dam member of FIG. 1 taken along the line I1-I1' of FIG. 1.

Referring to FIGS. 1 to 3, a dam member 100 may include an interception block 110 including a long side B, a short side A, and a cover sheet 120 attached to any one surface (e.g., any one of an upper surface and a lower surface) of the interception block 110. The cover sheet 120 may include a surface that projects or extends in a direction of the long side B of the interception block 110 (e.g., a surface that is parallel to the long side B of the interception block 110).

In one embodiment, the horizontal cross-section (a cross-section cut along a horizontal plane) of the interception block 110 of the dam member 100 may be in a tetragonal shape including the long side B and the short side A, and may include a rectangular shape having a long side. Further, the interception block 110 may be in a cuboidal shape in which upper and lower surfaces are in parallel to each other and a specific height is set between the upper and lower surfaces. Further, the height of the interception block 110 may be about 10% to 20% of the length of the short side A. For example, the length of the short side A of the interception block 110 may be 0.5 mm to 4 mm, and the height of the interception block 110 may be 0.1 mm to 0.8 mm. For example, if the length of the short side A of the interception block 110 is about 2 mm, the height of the interception block 110 may be about 0.25 mm.

Accordingly, if the dam member is applied to a display apparatus to be described later, resin provided in a display region can be effectively prevented or reduced from overflowing to a circuit region.

The cover sheet 120 may include a surface that projects in (e.g., is parallel to) the direction of the long side B of the interception block 110 (i.e., extending in a direction of the long side B). In other words, the cover sheet 120 may be attached to any one of an upper surface and a lower surface of the interception block 110, and may project to (extend toward) the direction that is parallel to the short side A of the interception block 110. Accordingly, the surface, on which the cover sheet 120 and the interception block 110 come in contact with each other, may be included in the surface of the interception block 110 on which the cover sheet 120 is formed. Further, the horizontal cross-section of the cover sheet 120 may be in a rectangular shape, but is not limited thereto. According to circumstances, the shape of the horizontal cross-section may be appropriately changed, and the details thereof will be described later.

The length C1 of the cover sheet 120 in the direction that is parallel to the long side B of the interception block 110 may be equal to or smaller than the length of the long side B of the interception block 110. If it is assumed that the length C1 of cover sheet 120 in the direction that is parallel to the long side B of the interception block 110 is the width of the cover sheet 120, the width of the cover sheet 120 may be appropriately adjusted according to circumstances. For example, although FIG. 1 illustrates that the length of the long side B of the interception block 110 is equal to the length C1 of the cover sheet 120 in the direction that is parallel to the long side B of the interception block 110, the width of the cover sheet 120 may be set to be smaller than the length of the long side B of the interception block 110 as in the dam member 101 according to another embodiment in FIG. 4 to be described later.

The cover sheet 120 may be applied to the display apparatus to be described later to secondarily prevent or reduce the resin, which is not intercepted by the interception block but overflows from the display region, from penetrating into a button portion of a window. Accordingly, the width of the cover sheet 120 may be set to the same length as the long side B of the interception block 110 or may be adjusted to match the width of the button portion to be protected.

Figure 4:
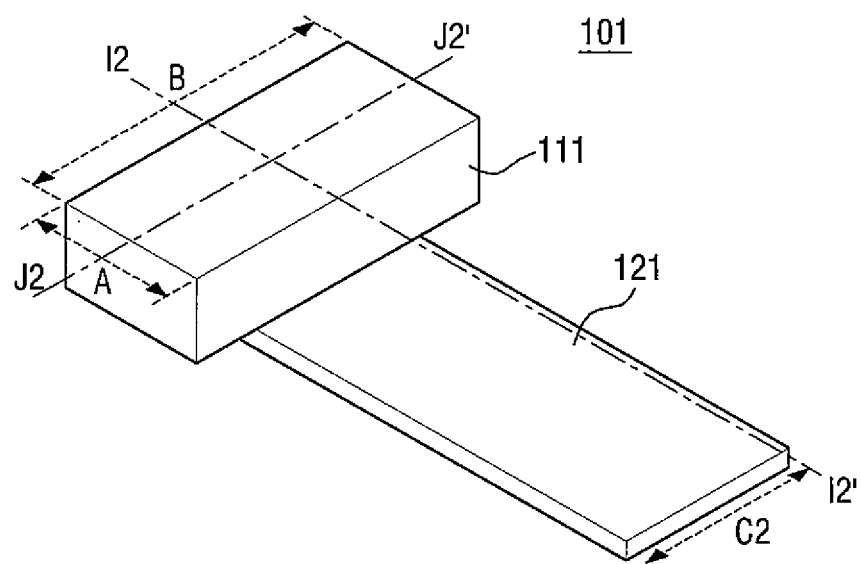
FIG. 4 is a perspective view of a dam member according to another embodiment of the present invention.
Figure 5:
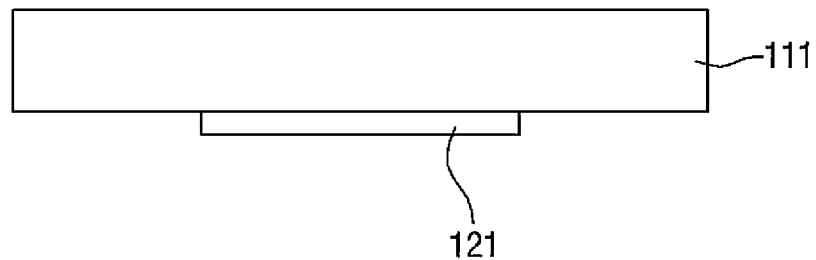
FIG. 5 is a cross-sectional view of the dam member of FIG. 4 taken along the line J2-J2' of FIG. 4.

FIG. 4 is a perspective view of a dam member according to another embodiment of the present invention. FIG. 5 is a cross-sectional view of the dam member of FIG. 4 taken along the line J2-J2' of FIG. 4, and FIG. 6 is a cross-sectional view of the dam member of FIG. 4 taken along the line I2-I2' of FIG. 4.

Figure 6:
FIG. 6 is a cross-sectional view of the dam member of FIG. 4 taken along the line I2-I2' of FIG. 4.

Referring to FIGS. 4 to 6, the width C2 of a cover sheet 121 may be set to be smaller than the length of the long side B of an interception block 111. Since other configurations are the same as those of the dam member as described above, the duplicate description thereof will not be repeated.

Figure 7:
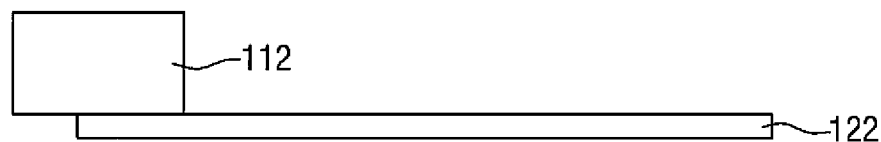
FIG. 7 is a cross-sectional view of a dam member according to still another embodiment of the present invention.

FIG. 7 is a cross-sectional view of a dam member 102 according to still another embodiment of the present invention. Referring to FIG. 7, a cover sheet 122 may come in contact with a part of (i.e., a portion of) one surface of an interception block 112 to be attached thereto. Since other configurations are the same as those of the dam member as described above, the duplicate description thereof will not be repeated.

Figure 8:
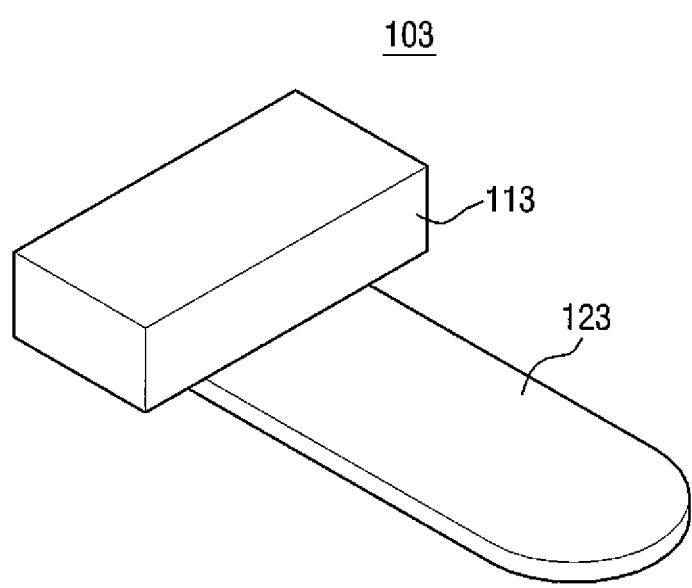
FIGS. 8 to 10 are perspective views of a dam member, each according to a respective embodiment of the present invention.

FIG. 8 is a cross-sectional view of a dam member 103 according to still another embodiment of the present invention. Referring to FIG. 8, the horizontal cross-section of an end surface (an end portion, opposite to the portion that is in contact with the interception block 112) of a cover sheet 123 may be rounded to include a semi-circular shape. Further, although not illustrated in the drawing, the horizontal cross-section of the cover sheet 123 may be in various suitable shapes, such as an ellipse or a triangle. Since other configurations are the same as those of the dam member as described above, the duplicate description thereof will not be repeated.

Figure 9:
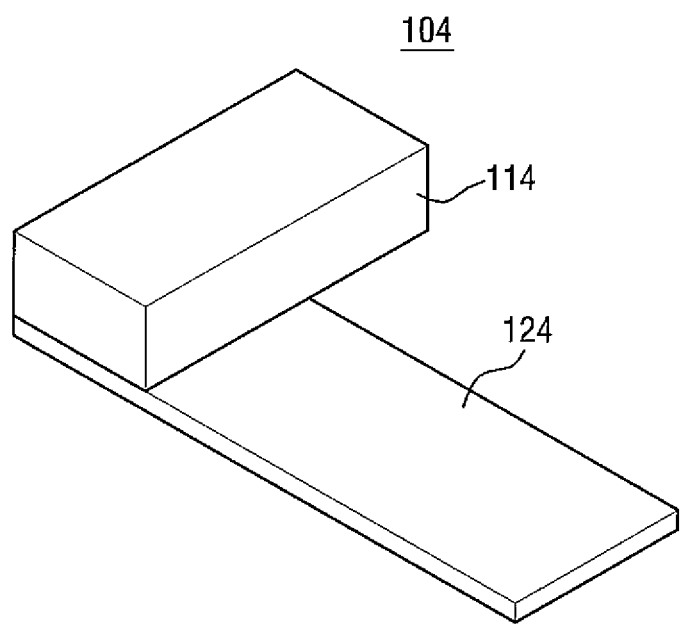

FIG. 9 is a cross-sectional view of a dam member 104 according to still another embodiment of the present invention. Referring to FIG. 9, a cover sheet 124 that is attached to an interception block 114 may be attached to lean to one side of one surface of the interception block 114. Since the cover sheet 124 is to prevent or reduce resin from penetrating into a button portion of a display apparatus to be described later, the position of the cover sheet 124 may be variously changed depending on the position of the button portion or the position of a button driving portion that is formed on the button portion. Since other configurations are the same as those of the dam member as described above, the duplicate description thereof will not be repeated.

Figure 10:
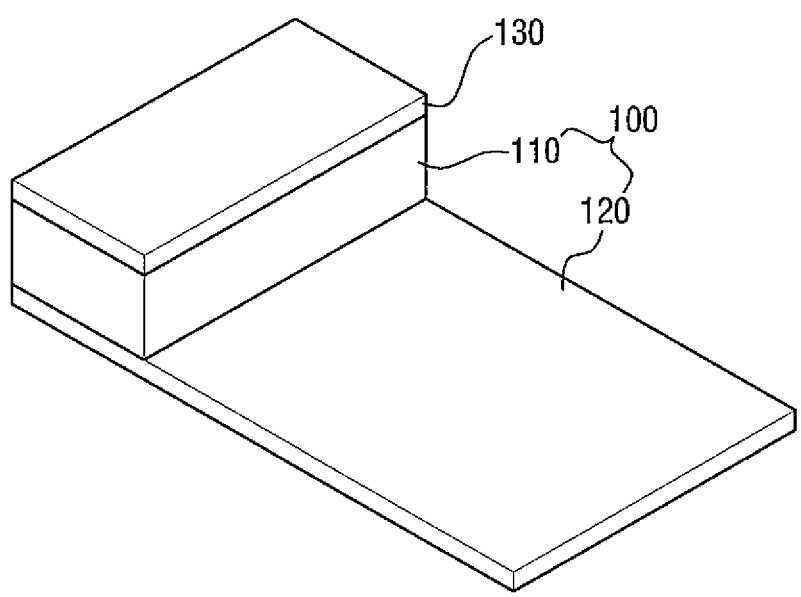

As illustrated in FIG. 10, a dam member 100 may further include an adhesive member 130. In other words, the adhesive member 130 that is positioned on an opposite surface of the interception block 110 to the surface to which a cover sheet 120 is attached, and the adhesive member 130 may be formed to attach the dam member to a window, or to attach the dam member to a light blocking member that is positioned on a lower surface of the window in a display apparatus to be described later.

Figure 11:
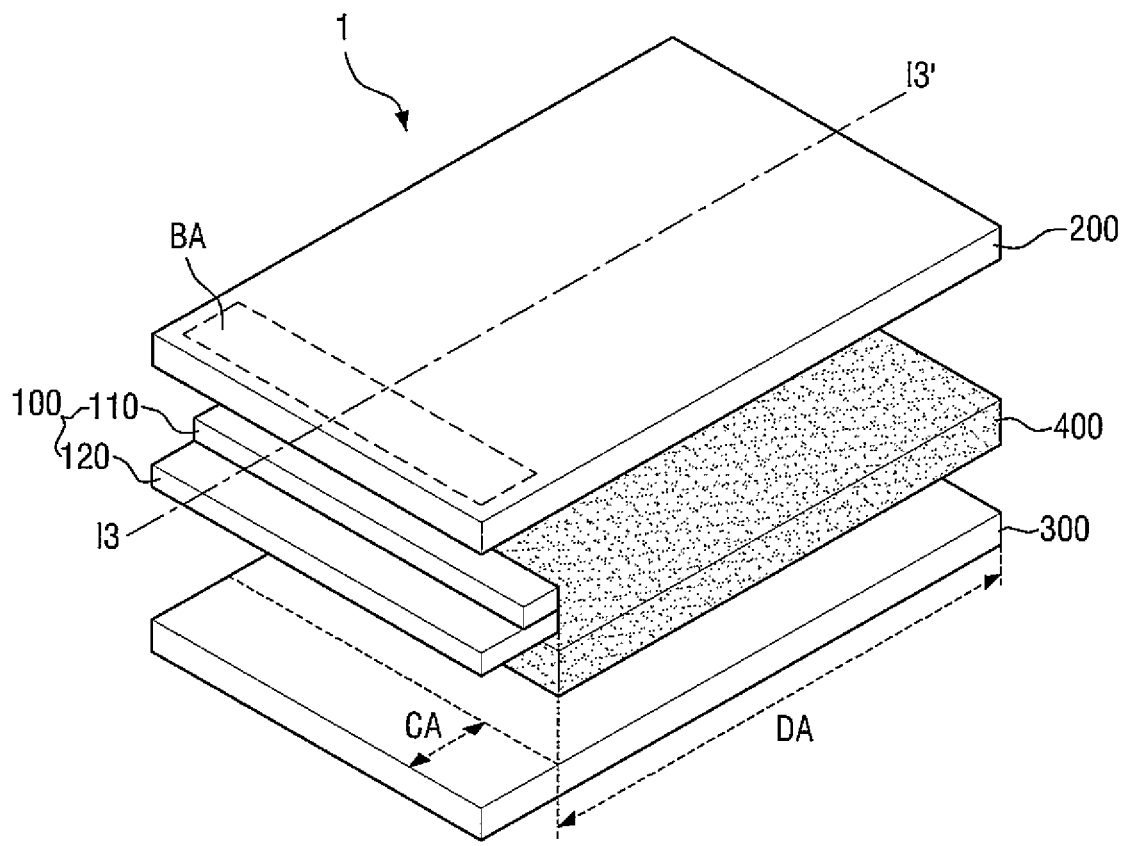
FIG. 11 is an exploded perspective view illustrating the schematic configuration of a display apparatus according to an embodiment of the present invention.
Figure 12:
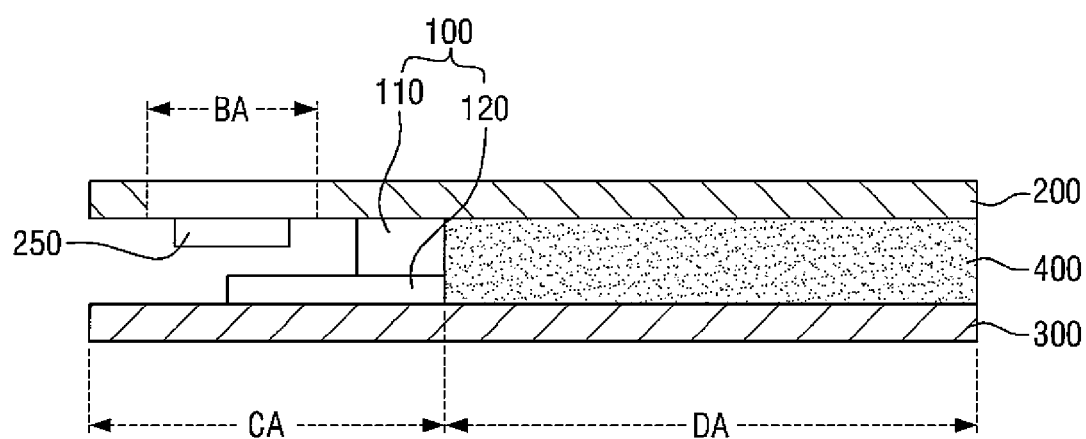
FIG. 12 is a cross-sectional view of the display apparatus of FIG. 11 taken along the line I3-I3' of FIG. 11.

FIG. 11 is an exploded perspective view illustrating the schematic configuration of a display apparatus 1 according to an embodiment of the present invention, and FIG. 12 is a cross-sectional view of the display apparatus 1 of FIG. 11 taken along the line I3-I3' of FIG. 11.

Referring to FIGS. 11 and 12, a display apparatus 1 may include a display module 300 including a display region DA and a circuit region CA, a window 200 facing the display module 300 and including a button portion BA, a bonding member 400 arranged between the display region DA of the display module 300 and the window 200 and bonding the display module 300 and the window 200 to each other, and a dam member 100 positioned along a boundary between the display region DA and the circuit region CA to prevent or reduce the bonding member 400 from overflowing (overflowing from) the display region DA. The dam member 100 may include an interception block 110 preventing or reducing the bonding member 400 from penetrating into the circuit region CA, and a cover sheet 120 preventing or reducing the bonding member 400 from penetrating into the button portion BA.

The display module 300 may include a display panel that displays an image, and the kind of the display panel is not limited. As the display panel, a self-luminous display panel, such as an organic light emitting display panel (OLED panel), may be used (utilized). Further, a non-luminous display panel, such as a liquid crystal display panel (LCD panel), an electrophoretic display panel (EPD panel), or an electrowetting display panel (EWD panel), may be used (utilized). In the case of using (utilizing) the non-luminous display panel as the display panel, the display module 300 may further include a backlight unit that supplies light to the display panel.

Figure 13:
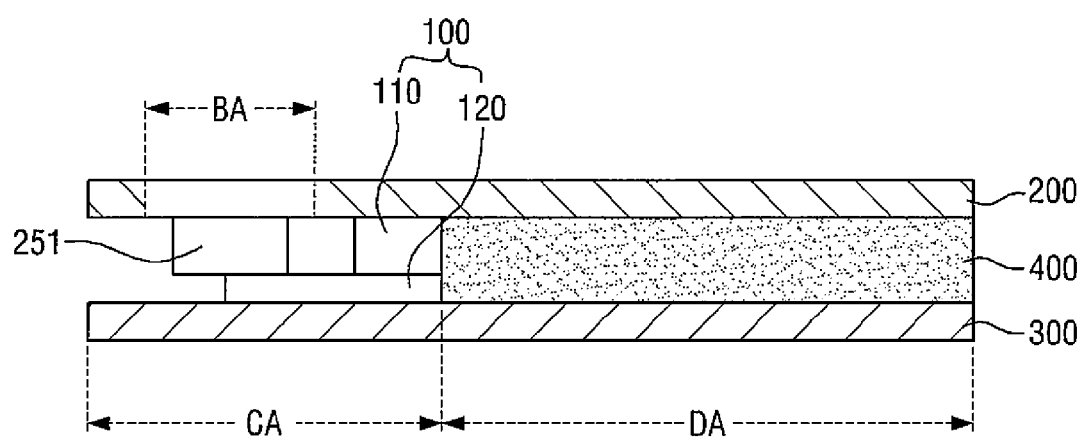
FIG. 13 is a cross-sectional view of a display apparatus according to a respective embodiment of the present invention.

The display module 300 may be in the form of a rectangular plane, and may include a display region DA (on which an image is displayed) and a non-display region NDA (on which an image is not displayed) (see FIG. 13). Further, on the basis of the drawing, the display region DA and the non-display region NDA may be adjacent to each other, and the display region DA may be positioned on the lower side (the lower surface) of the button portion BA of the window 200.

The window 200 may be positioned on the display module 300. The window 200 may be positioned in the direction in which an image is output (displayed) from the display module 300 to face the display module 300. The window 200 may be made of a transparent material so that an external viewer can visually recognize the image output from the display module 300, and may be made of, for example, glass or transparent polymer resin. Further, the window 200 may serve to prevent or reduce the display module 300 from being damaged due to an external impact and serve to protect an internal device, such as an integrated circuit.

The window 200 may include the button portion BA. The display apparatus 1 may be driven through the button portion BA. That is, in accordance with a signal that is applied to the button portion BA, the display module 300 is driven by the signal that is transferred to the display module 300. The button portion BA may include physical buttons to transfer an externally input signal to an integrated circuit in the display apparatus 1, or an electrostatic touchpad to transfer an electrical signal through touch of the touchpad, but is not limited thereto. Further, the button portion BA may include a button driving portion that is provided on the surface that faces the display module 300 to process the externally transferred signal. This will be described in more detail later.

The window 200 may be arranged (to face the display module 300) on the display module 300, and may cover the display region DA and the non-display region NDA of the display module 300. The window 200 may be attached to the display module 300 by the bonding member 400 that is positioned between the display module 300 and the window 200, and may protect the display module 300 together with the bonding member 400 to improve impact resistance of the display apparatus 1. The window 200 may be larger than the display module 300, but is not limited thereto. The window 200 may have substantially an equal size to the size of the display module 300.

The bonding member 400 may be positioned between the window 200 and the display module 300, and the bonding member 400 may be positioned between the display region DA of the display module 300 and the window 200. As the bonding member 400 is positioned between the display module 300 and the window 200, an air gap can be prevented or reduced from being formed between the display module 300 and the window 200, and foreign substances, such as dust, can be prevented or reduced from flowing in between the display module 300 and the window 200. Accordingly, formation of the air gap and inflow of the foreign substances can be prevented or reduced, and thus the image that is displayed on the display module 300 can be prevented or reduced from being distorted.

The bonding member 400 may serve to bond the display module 300 and the window 200 together, and protect the display module 300 and the window 200 against an external impact to improve the impact resistance of the display apparatus 1.

The bonding member 400 may include resin. That is, the bonding member 400 may be formed through processes of forming resin having fluidity between the display module 300 and the window 200, and then curing the resin. Accordingly, the bonding member 400 may have fluidity before the curing process is performed. The bonding member 400 may include resin having high light transmission, and the resin may be, for example, OCR (Optically Clear Resin), but is not limited thereto. Further, the bonding member 400 may be made of a material having an optical refractive index that is equal to or similar to the optical refractive index of the window 200 so that the bonding member 400 maintains the optical characteristics after the window 200 is attached thereto, but is not limited thereto. Further, the bonding member 400 may be made of light curable resin, for example, UV curable rein, but is not limited thereto. The bonding member 400 may also be made of thermosetting resin.

A dam member 100 may be positioned between the window 200 and the display module 300, and the dam member 100 may include the interception block 110 and the cover sheet 120. The interception block 110 of the dam member 100 may be arranged along the boundary between the display region DA and the circuit region CA. The interception block 110 of the dam member 100 may be arranged to partially overlap the circuit region CA, but is not limited thereto. A part of the interception block 110 may overlap the display region DA. Since the interception block 110 is arranged along the boundary between the display region DA and the circuit region CA, the bonding member 400 having fluidity can be prevented or reduced from penetrating from the display region DA to the circuit region CA.

Further, like the display apparatus 1 of FIG. 11, the interception block 110 of the dam member 100 may be arranged only on a boundary portion between the display region DA and the circuit region CA. That is, the interception block 110 of the dam member 100 may be in a long stripe shape that is substantially parallel to the side surface of the lower portion (i.e., the portion including the circuit region CA) of the display module 300, and in this case, the interception block 110 may have a length that is substantially equal to the length of the side surface of the lower portion of the display module 300, but is not limited thereto.

In one embodiment, the dam member 100 may include the interception block 110 (that prevents or reduces the bonding member 400 from penetrating into the circuit region CA), and the cover sheet 120 (that prevents or reduces the bonding member 400 from penetrating into the button portion BA). If the dam member 100 is composed of the interception block 110 only, inferiorities, such as imbalance of the height of the dam member 100 or disconnection of the dam, may occur and the bonding member 400 may overflow the dam member 100. In an embodiment, the dam member 100 includes both the interception block 110 and the cover sheet 120 attached to the interception block 110 to prevent or reduce the bonding member 400 from penetrating into the button portion BA, and thus the bonding member 400 that overflows the interception block 110 can be prevented or reduced from penetrating into the button portion BA.

The cover sheet 120 may be positioned on any one surface (i.e., any one surface of the upper surface and lower surface) of the interception block 110 to cover at least a part of the button portion BA. Further, the cover sheet 120 may be interposed between the interception block 110 and the display module 300 to be attached to the interception block 110, and may include a surface that projects (extends) toward the circuit region CA. That is, the cover sheet 120 may be attached to one surface of the interception block 110, and may project (extend) to the side surface of the circuit region CA on the display module 300 and to the side surface of the button portion BA on the button portion BA. Accordingly, the projecting surface of the cover sheet 120 may be positioned so that at least a part thereof is on an area where the button portion BA and the circuit region of the display module 300 overlaps.

On the other hand, the cover sheet 120 may be attached or adhered to the interception block 110, but is not limited thereto. For example, the interception block 110 and the cover sheet 120 may be provided in a body (as one piece). Since the dam member, in which the interception block 110 and the cover sheet 120 are made in a one-piece body, is prepared and positioned between the window 200 and the display module 300, the overflow of the bonding member 400 can be prevented or reduced. Further, since a desired or necessary dam member is manufactured in advance according to the model of the display module to be manufactured and then is attached to the display module, the overflow of the bonding member 400 can be prevented or reduced although it takes a small amount of time in setting the dam member.

The window 200 may include a button driving portion 250 (see FIG. 12) which corresponds to the circuit region CA of the display module 300 and is positioned on the lower side of the button portion BA, and the cover sheet 120 may cover at least a part of the button driving portion 250. The button driving portion 250 may include an integrated circuit chip or a driving circuit, which is electrically connected to the display module 300, and processes and transfers a signal input from the button portion BA to the display module 300 to display an image.

Referring to FIG. 13 a surface of the interception block 110 that faces the display module 300 may be positioned on the same horizontal line as the surface of the button driving portion 250 that faces the display module 300. That is, the height of the surface on which the interception block 110 comes in contact with or is attached to the display module 300 may be equal to the height of the surface of the button driving portion 250 that is positioned outside (away from the window 200) on the basis of the window 200, and the surfaces may be positioned on the same horizontal line (i.e., the surfaces may be flushed with each other). Accordingly, if the cover sheet 120 is attached to the interception block 110, the cover sheet 120 may come in contact with at least a part of the surface of the button driving portion 250 that faces the display module 300.

In other words, the cover sheet 120 may include the surface that projects (extends) toward the circuit region CA, and the projecting surface and the button driving portion 250 may partially overlap each other or may come in contact with each other on the same vertical line.

Figure 14:
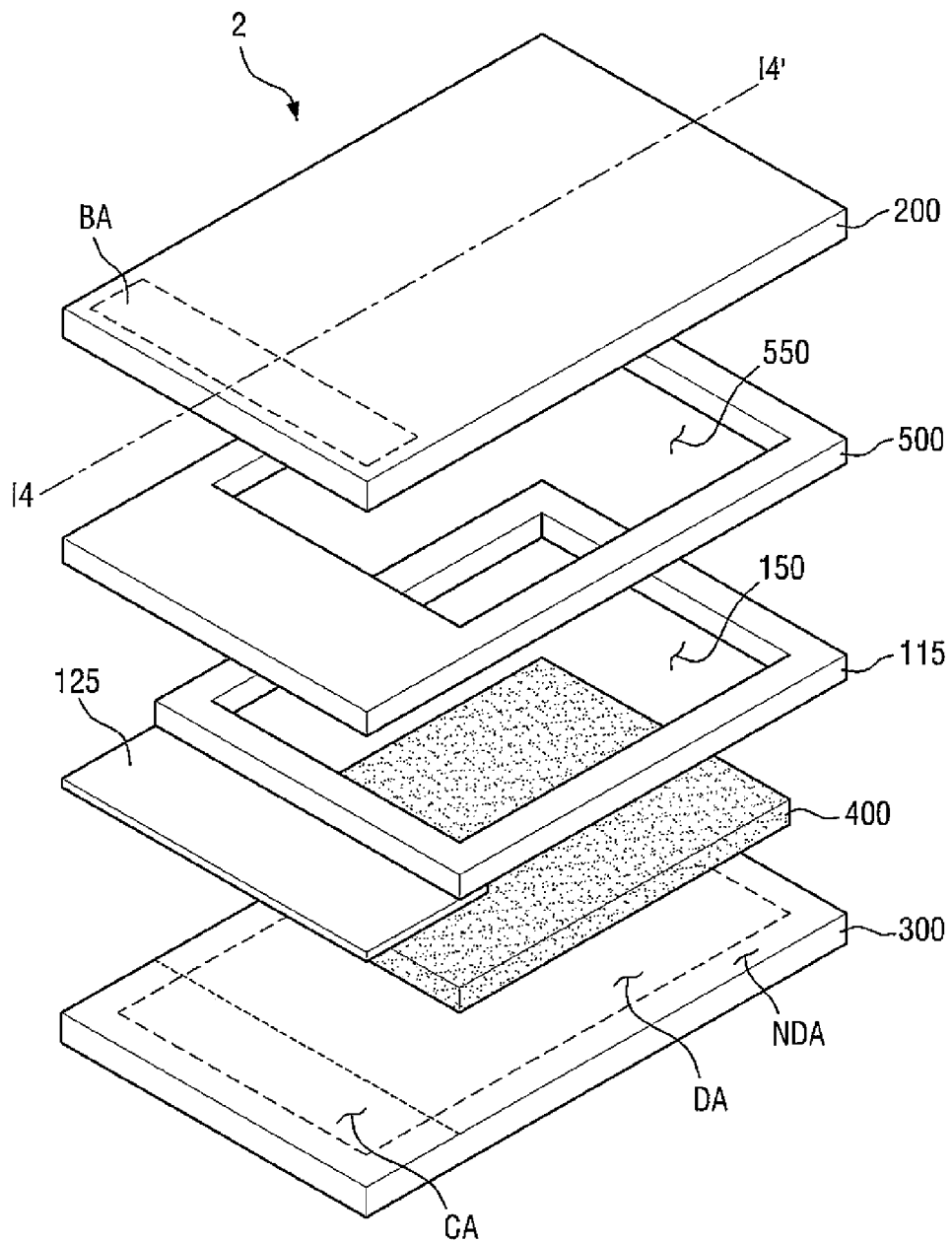
FIG. 14 is an exploded perspective view illustrating the schematic configuration of a display apparatus according to another embodiment of the present invention.
Figure 15:
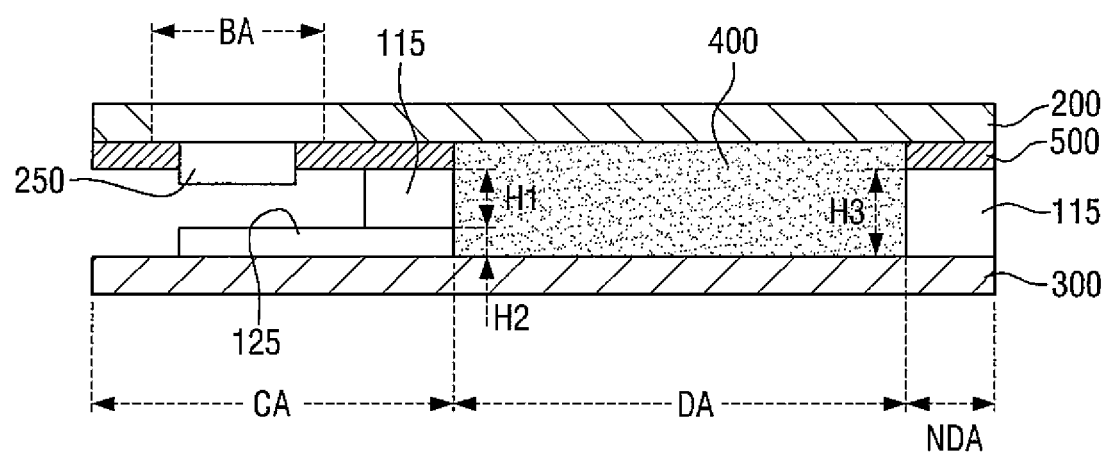
FIG. 15 is a cross-sectional view of the display apparatus of FIG. 14 taken along the line I4-I4' of FIG. 14.

FIG. 14 is an exploded perspective view illustrating the schematic configuration of a display apparatus 2 according to another embodiment of the present invention, and FIG. 15 is a cross-sectional view of the display apparatus 2 of FIG. 14 taken along the line I4-I4' of FIG. 14.

Referring to FIGS. 14 and 15, an interception block 115 of a dam member of a display apparatus 2 may be positioned between a display module 300 and a window 200, and may be arranged along the circumference of the side surface of a bonding member 400. That is, as illustrated in FIG. 14, the interception block 115 of the dam member may be formed along the outer circumference of the bonding member 400 in a state where an empty space 150 that is enough to accommodate the bonding member 300 is formed in the interception block 115. Accordingly, the bonding member can be prevented or reduced from overflowing outside of the display region DA.

Figure 16:
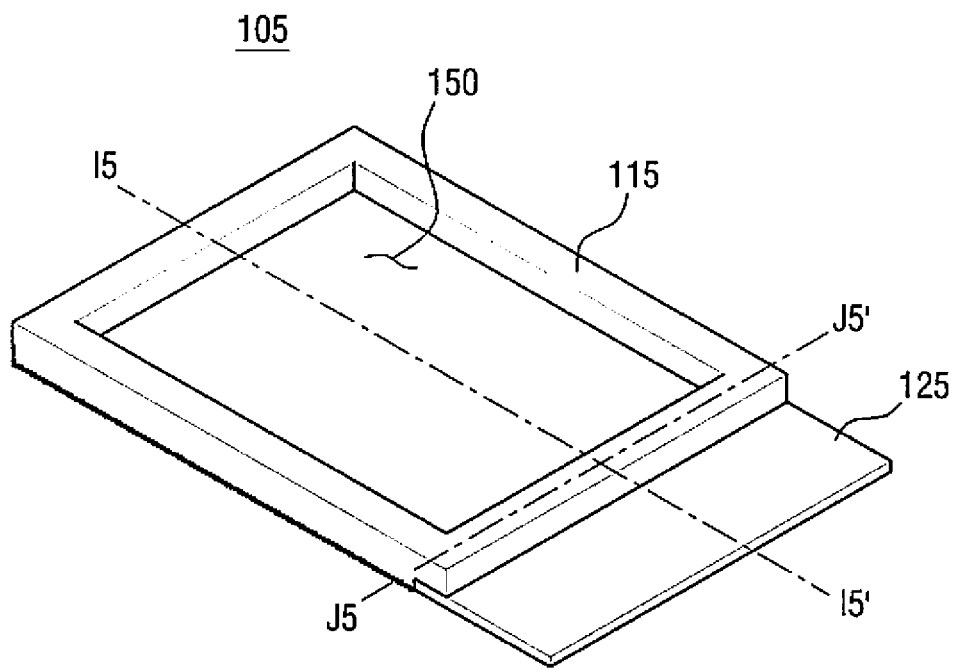
FIG. 16 is a perspective view of a dam member according to still another embodiment of the present invention.
Figure 17:
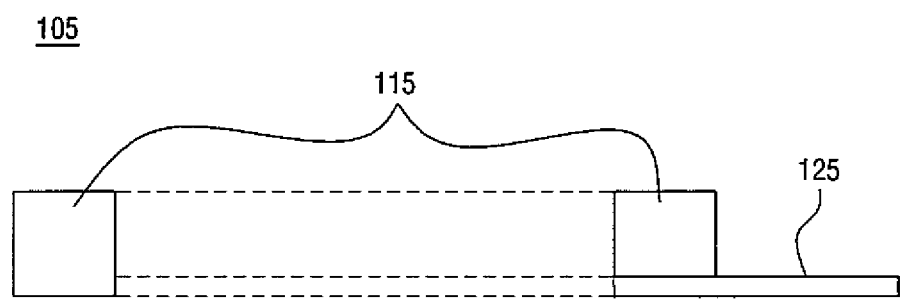
FIG. 17 is a cross-sectional view of the dam member of FIG. 16 taken along the line I5-I5' of FIG. 16.

FIG. 16 is a perspective view of a dam member 105 according to still another embodiment of the present invention. FIG. 17 is a cross-sectional view of the dam member 105 of FIG. 16 taken along the line I5-I5' of FIG. 16, and FIG. 18 is a cross-sectional view of the dam member 105 of FIG. 16 taken along the line J5-J5' of FIG. 16.

Figure 18:
FIG. 18 is a cross-sectional view of the dam member of FIG. 16 taken along the line J5-J5' of FIG. 16.

Referring to FIGS. 16 to 18, a dam member 105 will be described in more detail. The interception block 115 of the dam member 105 may be arranged to entirely surround the four side surfaces of the display module 300. That is, the interception block 115 may be arranged along the circumference of the side surface of the bonding member 400, and may serve as a barrier that prevents or reduces a part of the bonding member 400 from leaking to an outside (or outline) in the process of forming the bonding member 400 or in the process of bonding the display module 300 and the window 200 together. Further, if the interception block 115 is arranged along the circumference of the side surface of the bonding member 400, the cover sheet 125 may be attached to one side surface (e.g., the upper surface or the lower surface) of the interception block 115 on which the circuit region CA and the button portion BA are positioned to prevent or reduce the bonding member 400 from flowing and penetrating into the button portion BA.

On the other hand, the bonding member 400 may be partially positioned between the non-display region NDA of the display module 300 and the window 200.

The cover sheet 125 of the dam member 105 may be attached to a step height that is formed on one side surface of the interception block 115. Referring to FIGS. 16, 17, and 18, the height of the interception block in the position to which the cover sheet 125 is attached may be lower than the height of the interception block 115 in the position to which the cover sheet 125 is not attached, and by attaching the cover sheet 125 thereto, the interception block 115 may have the same height (i.e., the portion of the dam member 105 that includes the interception block 115 may have the same height). That is, if it is assumed that the height of the interception block 115 in the position to which the cover sheet 125 is attached is H1, the height of the interception block 115 in the position to which the cover sheet 125 is not attached is H3, and the height of the cover sheet 125 itself is H2, the dam member 105 with the height of H3 can be formed through attachment of the cover sheet 125 and the interception block 115 in the position to which the cover sheet 125 is attached.

Figure 19:
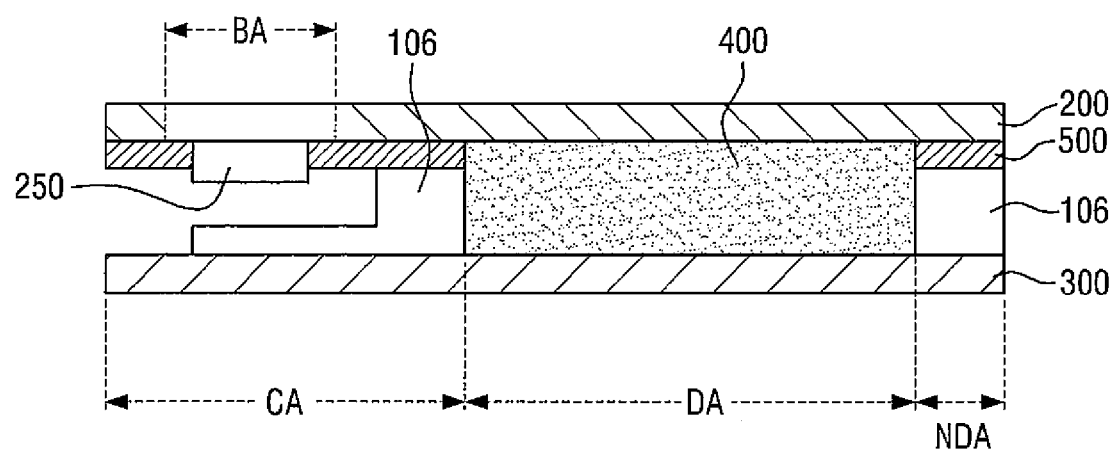
FIGS. 19 to 22 are cross-sectional views of a display apparatus, each according to a respective embodiment of the present invention.

FIG. 19 is a cross-sectional view of a display apparatus according to still another embodiment of the present invention. Referring to FIG. 19, a display apparatus may include a dam member 106 in which an interception block and a cover sheet are formed in a body (in one piece), and the interception block may have the same height except for the portion where the cover sheet projects. Since other configurations of the display apparatus of FIG. 19, except that the dam member 106 is integrally formed, are the same as those of the display apparatus as described above, the duplicate description thereof will not be repeated.

Figure 20:
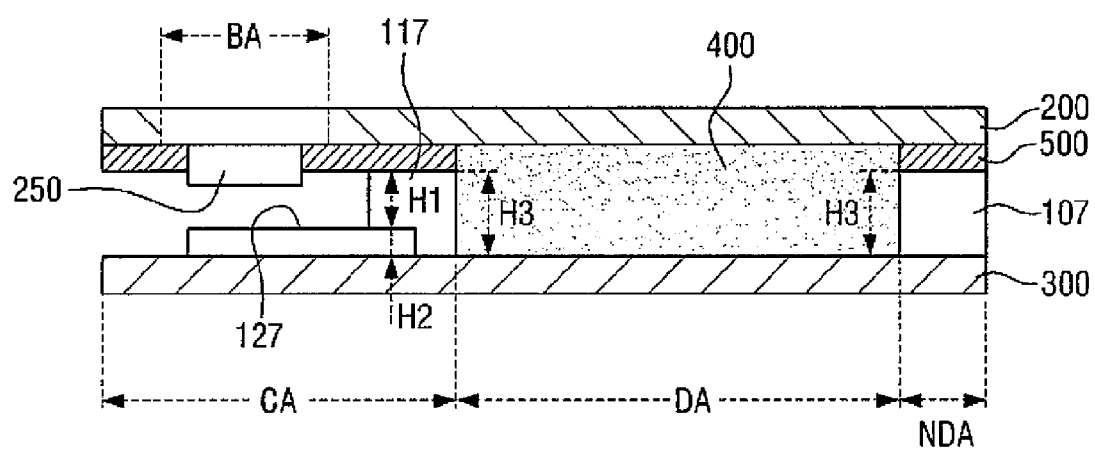
Figure 21:
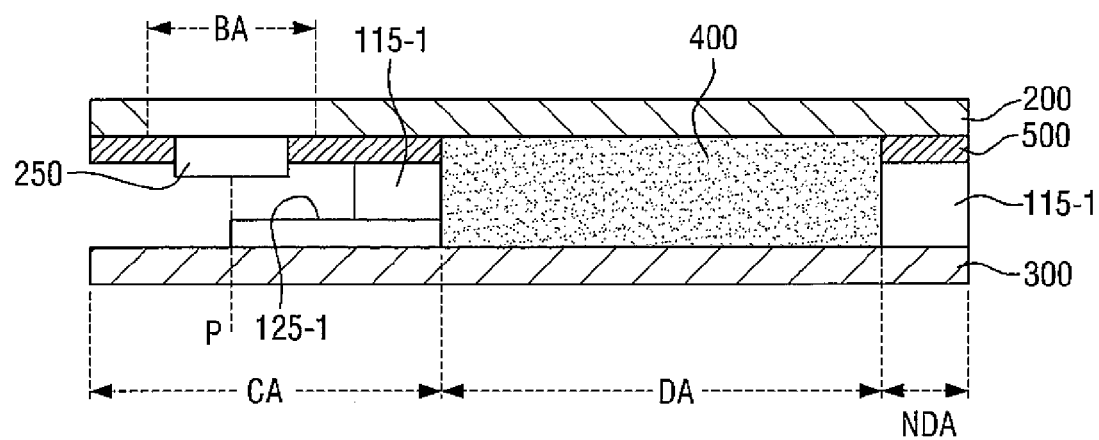
Figure 22:
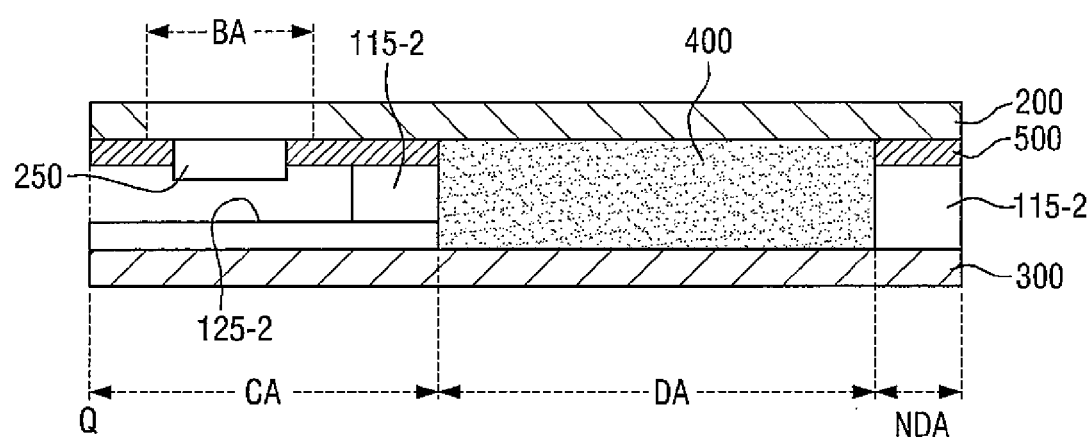

FIGS. 20 to 22 are cross-sectional views of a display apparatus, each according to a respective embodiment of the present invention. Referring to FIGS. 20 to 22, a cover sheet 127 of FIG. 20 may be attached to the step height that is formed on a part of one surface of the interception block 117.

Further, as shown in FIG. 21, a cover sheet 125-1 may partially overlap a button driving portion 250. That is, the cover sheet 125-1 may project with a length to cover only a part of the button driving portion 250 rather than the whole area of the button driving portion 250, and for example, the end portion P of the projecting cover sheet 125-1 may be positioned on the button driving portion 250 on the vertical line (i.e., the vertical projection of the end portion P may be positioned on the button driving portion 250).

On the other hand, as shown in FIG. 22, unlike FIG. 21, the cover sheet 125-2 may entirely cover the button driving portion 250 over the button driving portion 250, and in this case, the button driving portion 250 may not be positioned on the vertical line of the end portion Q of the projecting cover sheet 125-2 (i.e., the vertical projection of the end portion Q may not be positioned on the button driving portion 250).

Referring again to FIGS. 14 and 15, the display apparatus 2 may further include a light blocking member 500 that is provided on the lower side surface of the window 200, that is, on the side of the window 200 that faces the display module 300. The light blocking member 500 may be shaped to correspond to the non-display region NDA of the display module 300 to cover the non-display region NDA of the display module 300. Further, although not illustrated, the light blocking member 500 may include an empty space that corresponds to the shape of the button driving portion 250 positioned on the lower side of the button portion BA.

The light blocking member 500 serves to prevent or reduce the non-display region NDA of the display module 300 from being visually recognized to an outside. The light blocking member 500 may include a light absorption material or a light blocking material, and for example, the light blocking member 500 may include a metal material having low reflectivity, which may be one selected from chrome (Cr) and molybdenum (Mo). Further, the light blocking member 500 may include an opaque inorganic insulating material, which may be one selected from CrOx and MoOx. Further, the light blocking member 500 may include an opaque organic insulating material, such as carbon black.

Figure 23:
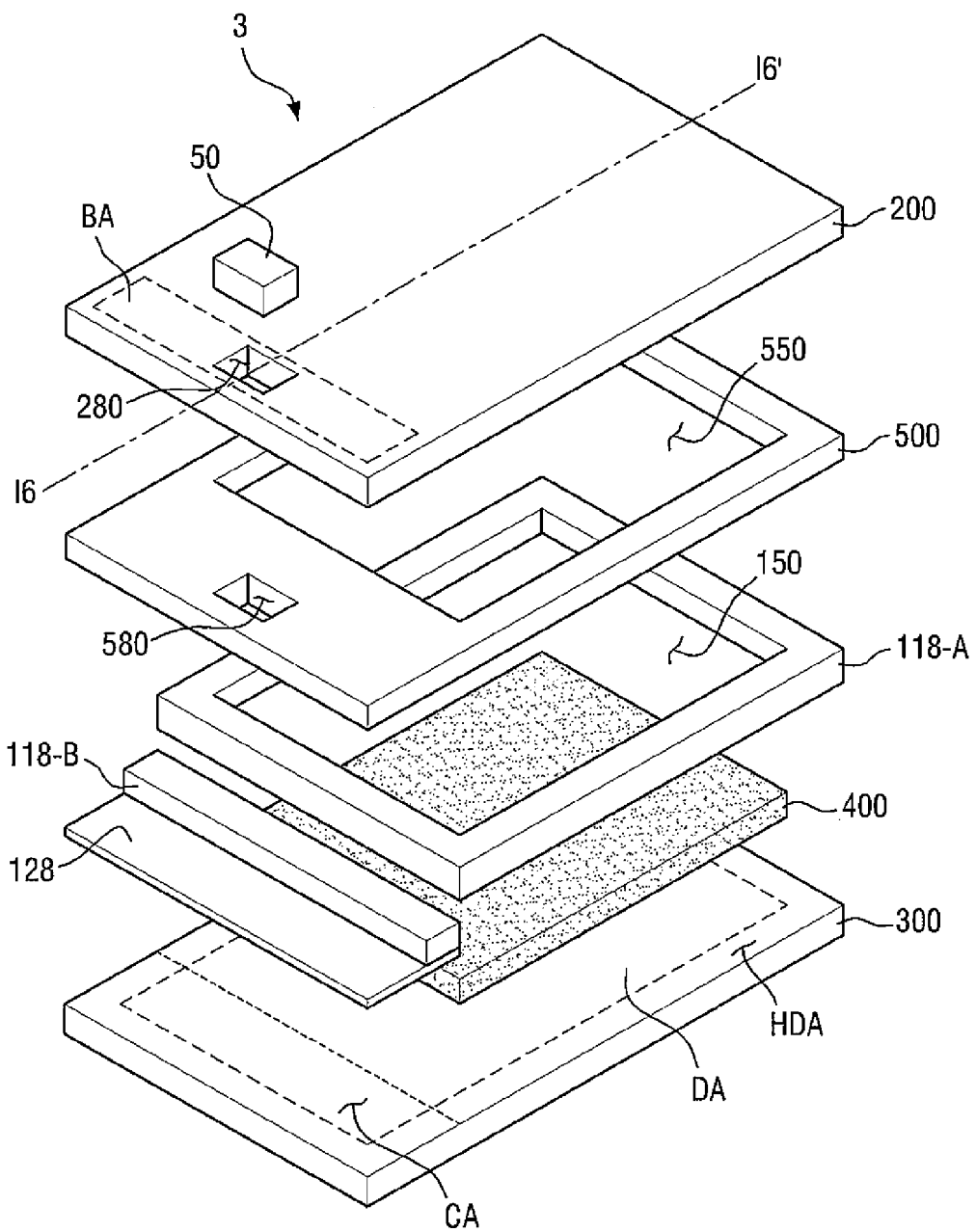
FIG. 23 is an exploded perspective view illustrating the schematic configuration of a display apparatus according to still another embodiment of the present invention.
Figure 24:
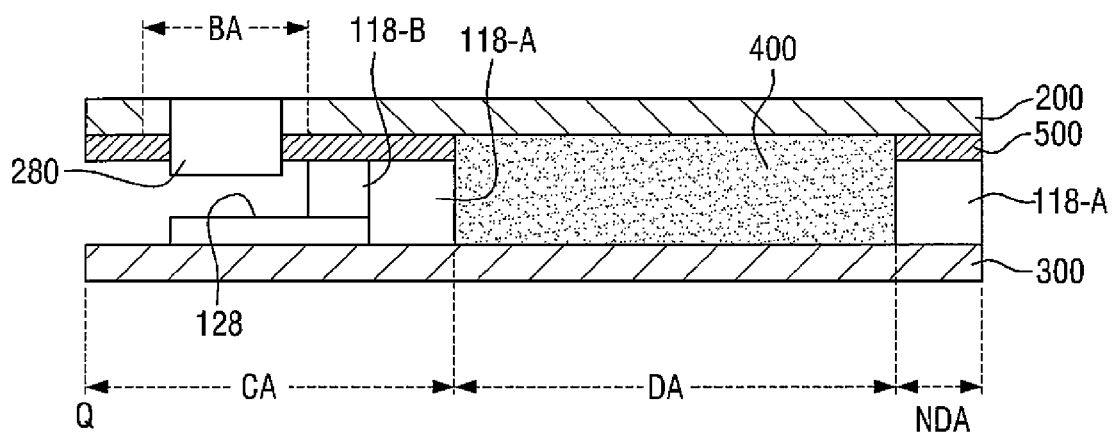
FIG. 24 is a cross-sectional view of the display apparatus of FIG. 23 taken along the line I6-I6' of FIG. 23.

FIG. 23 is an exploded perspective view illustrating the schematic configuration of a display apparatus 3 according to still another embodiment of the present invention, and FIG. 24 is a cross-sectional view of the display apparatus 3 of FIG. 23 taken along the line I6-I6' of FIG. 23.

Referring to FIGS. 23 and 24, a dam member may include a first interception block 118-A which is positioned between a display module 300 and a window 200 and is arranged along the circumference of the side surface of a bonding member 400, a second interception block 118-B which is positioned along the boundary between a display region DA and a circuit region CA of the display module 300 to prevent or reduce the bonding member 400 from overflowing (overflowing from) the display region DA, and a cover sheet 128 which is attached to the second interception block 118-B and projects to (extends towards) the circuit region CA to prevent or reduce the bonding member 400 from penetrating into a button portion BA.

That is, the first interception block 118-A may prevent or reduce the bonding member 400 from overflowing to an outside of the display apparatus 3 and primarily prevent or reduce the bonding member from flowing to the circuit region CA, and the second interception block 118-B and the cover sheet 128 may prevent or reduce the bonding member 400 from penetrating into the circuit region CA and the button portion BA.

On the other hand, a groove for inserting a home button 50 therein may be formed on the button portion BA of the window 200, and the home button 50 may include a driver for driving a display module through application of a signal to the display module and a connection member. Since the above-described configurations are known in the art, the detailed description thereof will not be repeated.

Figure 25:
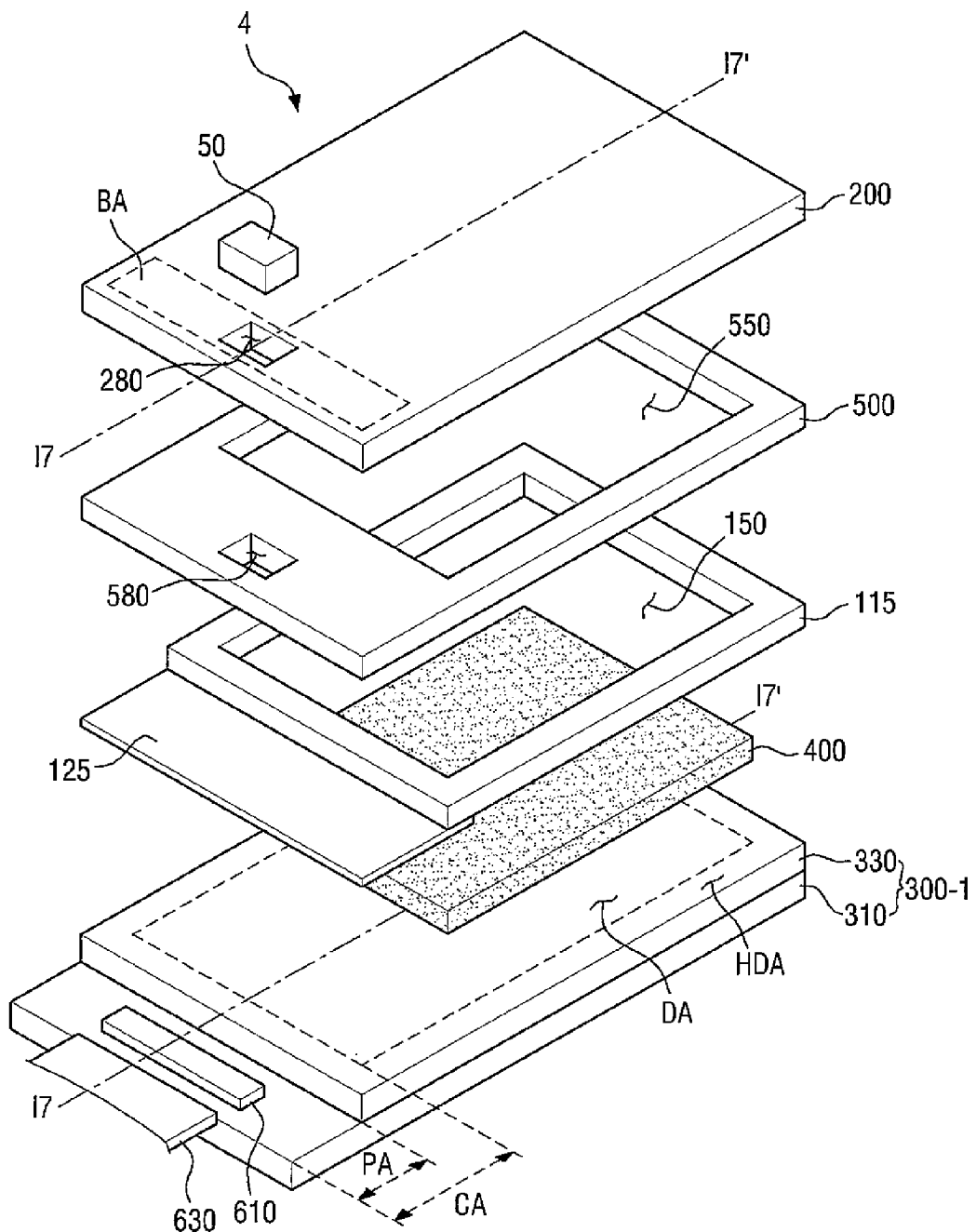
FIG. 25 is an exploded perspective view illustrating the schematic configuration of a display apparatus according to still another embodiment of the present invention.
Figure 26:
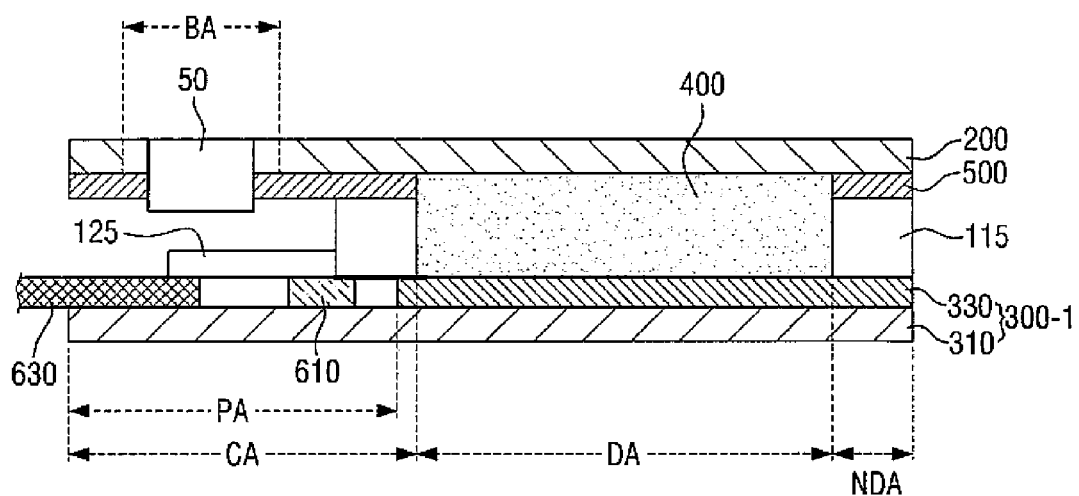
FIG. 26 is a cross-sectional view of the display apparatus of FIG. 25 taken along the line I7-I7' of FIG. 25.

FIG. 25 is an exploded perspective view illustrating the schematic configuration of a display apparatus 4 according to still another embodiment of the present invention, and FIG. 26 is a cross-sectional view of the display apparatus 4 of FIG. 25 taken along the line I7-I7' of FIG. 25.

Referring to FIGS. 25 and 26, the display apparatus 4 may further include an integrated circuit chip 610 that is positioned on a circuit region CA. Further, an interception block 115 may cover at least a part of the integrated circuit chip 610.

A display module 300-1 may include a first substrate 310, and a second substrate 330 which corresponds to a display region DA and is positioned on the first substrate 310, and the integrated circuit chip 610 may be mounted on the first substrate 310 that corresponds to the circuit region CA.

The display module 300-1 may include the first substrate 310 and the second substrate 330 that face each other. If the display module 300-1 includes liquid crystals, the liquid crystals may be positioned between the first substrate 310 and the second substrate 330. Further, if the display module 300-1 includes organic light emitting diodes, the organic light emitting diodes may be positioned between the first substrate 310 and the second substrate 330.

The first substrate 310 may have a first area, and the second substrate 330 may have a second area that is smaller than the first area. Since the second substrate 330 has the area that is smaller than the area of the first substrate 310, the second substrate 330 may expose a part of the first substrate 310 that corresponds to the circuit region CA. That is, the first substrate 310 may include an exposure region PA that is not covered by the second substrate 330. As illustrated in the drawing, the exposure region PA may be a part of the circuit region CA, but is not limited thereto. The exposure region and the circuit region CA may be the same.

The first substrate 310 and the second substrate 330 may be bonded together by a sealant that is arranged along the edge of the second substrate 330.

The integrated circuit chip 610 may be mounted on the exposure region of the first substrate 310, and the integrated circuit chip 610 may be mounted on the same surface of the first substrate 310 (e.g., the upper surface of the first substrate 310) as the second substrate 330. That is, the second substrate 330 and the integrated circuit chip 610 may be arranged in the neighborhood. The integrated circuit chip 610 may be mounted on the exposure region PA of the first substrate 310 in a chip on glass (COG) method, but is not limited thereto.

The first substrate 310 may include pixels arranged in the form of a matrix on the display region DA. Further, the first substrate 310 may include a driver arranged in the display region DA, the circuit region CA, or the exposure region PA to drive pixels. Further, the first substrate 310 may include pad electrodes arranged in the exposure region PA, and the integrated circuit chip 610 may be mounted on the exposure region PA of the first substrate 310 to be electrically connected to the pad electrodes. Further, the first substrate 310 may include wirings connecting the integrated circuit chip 610 and the driver to each other.

A chip connection member 630 may have one side connected to the exposure region PA of the first substrate 310 and the other side connected to a driving circuit. A driving signal that is generated from the driving circuit may be transferred to the integrated circuit chip 610 or the driver of the first substrate 310 through the chip connection member 630. The chip connection member 630 may be a flexible printed circuit board (FPCB), but is not limited thereto.

A window 200 may be positioned on the display module 300-1, and a light blocking member 500 may be positioned between the window 200 and the display module 300-1.

A bonding member 400 may be positioned between the window 200 and the display module 300-1. The bonding member 400 may be positioned between the display region DA of the display module 300-1 and the window 200, and may be partially positioned between a non-display region NDA of the display module 300-1 and the window 200. The bonding member 400 may bond the second substrate 330 of the display module 300-1 and the window 200 together.

A dam member that includes the interception block 115 and a cover sheet 125 may be positioned between the window 200 and the display module 300-1. The interception block 115 may be arranged along the boundary between the display region DA and the circuit region CA. The interception block 115 may be arranged to overlap the circuit region CA as shown in the drawing, but is not limited thereto. A part of the interception block 115 may overlap the display region DA. Since the interception block 115 is arranged along the boundary between the display region DA and the circuit region CA, the bonding member 400 having fluidity can be prevented or reduced from penetrating from the display region DA to the circuit region CA, and the cover sheet 125 attached to the interception block 115 can prevent or reduce the bonding member 400 from overflowing the interception block 115 and penetrating into a button portion BA.

Figure 27:
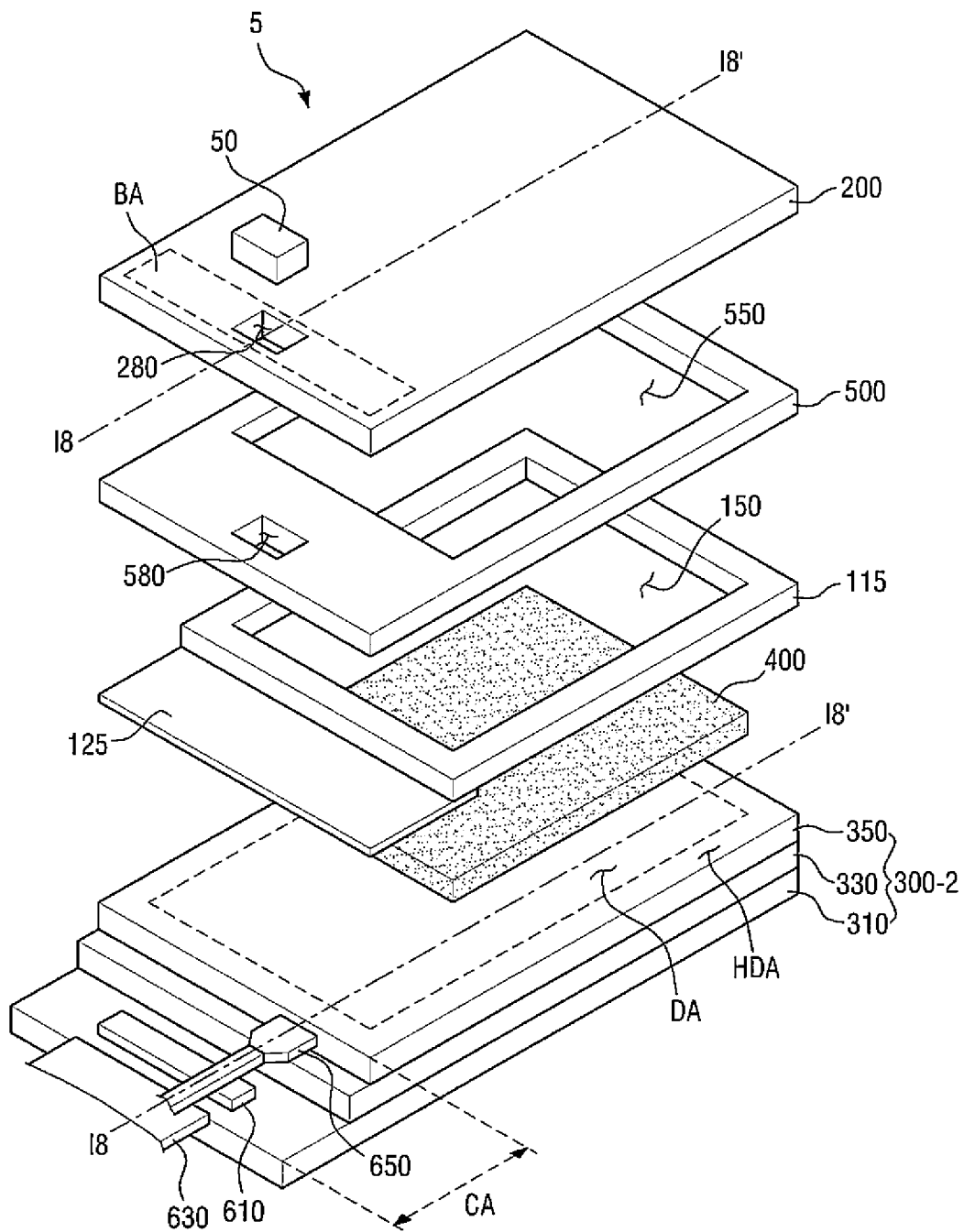
FIG. 27 is an exploded perspective view illustrating the schematic configuration of a display apparatus according to still another embodiment of the present invention.
Figure 28:
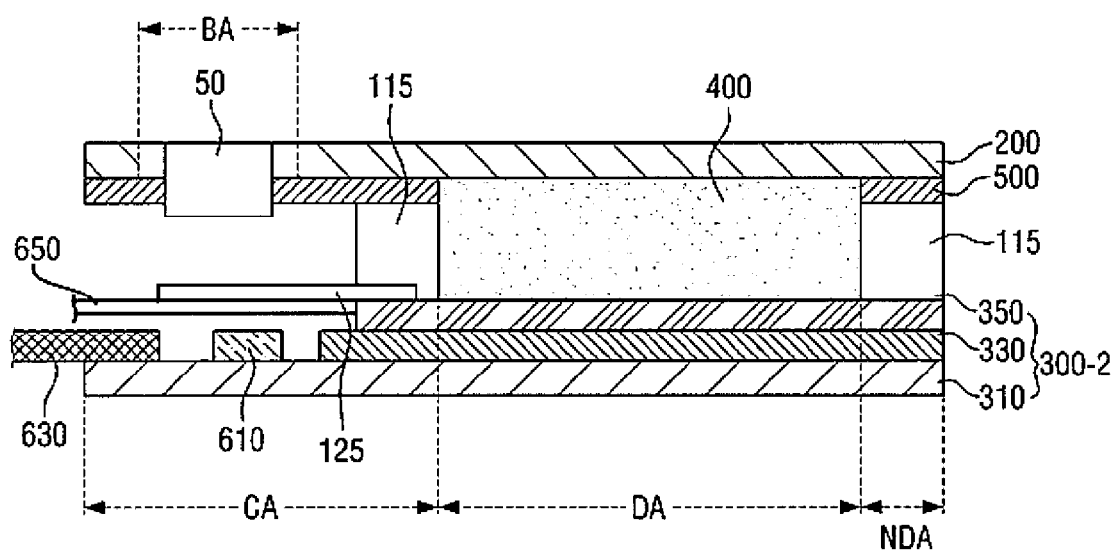
FIG. 28 is a cross-sectional view of the display apparatus of FIG. 27 taken along the line I8-I8' of FIG. 27.

FIG. 27 is an exploded perspective view illustrating the schematic configuration of a display apparatus 5 according to still another embodiment of the present invention, and FIG. 28 is a cross-sectional view of the display apparatus 5 of FIG. 27 taken along the line I8-I8' of FIG. 27.

Referring to FIGS. 27 and 28, a display apparatus 5 may further include a connection member 650 having one side that is connected to a display module 300-2, and a cover sheet 125 may cover one side of the connection member. Further, the display module 300-2 may include display panels (e.g., first and second substrates) 310 and 330 and a touch panel 350 that is positioned on the display panels 310 and 330, and one side of the connection member 650 may be connected to the touch panel 350.

For example, a display module 300-2 may include a first substrate 310, a second substrate 330 facing the first substrate 310, and the touch panel 350 that is positioned on the second substrate 330.

The touch panel 350 may be positioned on the second substrate 330 to correspond to a display region DA, and may recognize a touch by a touch mechanism, such as a pen or a user's finger, and transfer a signal that corresponds to a position where the touch is performed to a touch driving portion. The touch panel 350 is used (utilized) as an input mechanism of the display apparatus 5, and it is not specially limited. For example, the touch panel 350 may sense the touch through various suitable mechanisms, such as capacitive overlay, resistive overlay, infrared beam, integral strain gauge, surface acoustic wave, and/or piezoelectric mechanisms (types).

A connection member 650 may have one end connected to the touch panel 350 and the other end connected to a touch driving portion. The connection member 650 may transfer a signal that corresponds to the touch recognized by the touch panel 350 to the touch driving portion. The connection member 650 may include a flexible printed circuit board (FPCB), but is not limited thereto.

A window 200 may be positioned on the display module 300-2. That is, the window 200 may be positioned on the touch panel 350, and a light blocking member 500 may be positioned between the display module 300-2 and the window 200.

A bonding member 400 may be positioned between the window 200 and the display module 300-2. The bonding member 400 may be positioned between the display region DA of the display module 300-2 and the window 200, and may be partially positioned between a non-display region NDA of the display module 300-2 and the window 200. The bonding member 400 may bond the touch panel 350 of the display module 300-2 and the window 200 together.

A dam member that includes an interception block 115 and the cover sheet 125 may be positioned between the window 200 and the display module 300-2. The interception block 115 may be arranged along the boundary between the display region DA and a circuit region CA. The interception block 115 may be arranged to overlap the circuit region CA as shown in the drawing, but is not limited thereto. A part of the interception block 115 may overlap the display region DA. Since the interception block 115 is arranged along the boundary between the display region DA and the circuit region CA, the bonding member 400 having fluidity can be prevented or reduced from penetrating from the display region DA to the circuit region CA. Further, since the cover sheet 125 that is connected to the interception block 115 is formed to project to (extend into) the circuit region CA and a button portion BA, the bonding member 400 having fluidity can be prevented or reduced from overflowing the interception block 115 and penetrating into the button portion BA and a button driving portion 250.

The cover sheet 125 of the dam member may cover at least a part of the connection member 650 connected to the touch panel 350. For example, the cover sheet 125 may cover a connection region between the connection member 650 and the touch panel 350, that is, one end of the connection member 650. Accordingly, the bonding member 400 can be prevented or reduced from penetrating from the display region DA to the circuit region, and for example, the bonding member 400 can be effectively prevented or reduced from penetrating into the connection member 650. Further, although not illustrated, one end of the connection member 650 may be covered by the interception block 115.

However, embodiments of the effects of the present invention are not restricted to the ones set forth herein. The above and other effects of the present invention will become more apparent to one of daily skill in the art to which the present invention pertains by referencing the claims, and equivalents thereof.

While the present invention has been particularly shown and described with reference to example embodiments thereof, it will be understood by those of ordinary skill in the art that various changes in form and detail may be made therein without departing from the spirit and scope of the present invention as defined by the following claims, and equivalents thereof. The example embodiments should be considered in a descriptive sense only and not for purposes of limitation.

What is claimed is:

1. A display apparatus comprising:
   a display module comprising a display region and a circuit region;
   a window facing the display module and comprising a button portion;
   a bonding member between the display region of the display module and the window, and configured to bond the display module and the window to each other; and
   a dam member along a boundary between the display region and the circuit region to prevent or reduce the bonding member from overflowing from the display region,
   wherein the dam member comprises an interception block configured to prevent or reduce the bonding member from penetrating into the circuit region, and a cover sheet configured to prevent or reduce the bonding member from penetrating into the button portion.

2. The display apparatus of claim 1, wherein the cover sheet is on an upper surface or a lower surface of the interception block and covers at least a part of the button portion.

3. The display apparatus of claim 2, wherein the cover sheet is between the interception block and the display module, and has a surface that projects toward the circuit region.

4. The display apparatus of claim 3, wherein the projecting surface of the cover sheet is between the button portion and the circuit region of the display module.

5. The display apparatus of claim 1, wherein the cover sheet is attached to the interception block.

6. The display apparatus of claim 1, wherein the interception block and the cover sheet are integrated as one body.

7. The display apparatus of claim 1, wherein the interception block is between the display module and the window, and along a circumference of a side surface of the bonding member.

8. The display apparatus of claim 1, wherein the window comprises a button driving portion corresponding to the circuit region, the button driving portion is on a lower side of the window,
wherein the cover sheet covers at least a part of the button driving portion.

9. The display apparatus of claim 8, wherein a surface of the interception block that faces the display module and a surface of the button driving portion that faces the display module are positioned on a same horizontal line.

10. The display apparatus of claim 8, wherein the cover sheet comes in contact with a surface of the button driving portion that faces the display module.

11. The display apparatus of claim 8, wherein the cover sheet further has a surface that projects toward the circuit region, and
the projecting surface and the button driving portion overlap each other at least partly on a same vertical line.

12. The display apparatus of claim 1, further comprising an integrated circuit chip in the circuit region.

13. The display apparatus of claim 12, wherein the interception block covers at least a part of the integrated circuit chip.

14. The display apparatus of claim 12, wherein the display module comprises a first substrate and a second substrate, the second substrate corresponds to the display region and is on the first substrate, and
the integrated circuit chip is on the first substrate corresponding to the circuit region.

15. The display apparatus of claim 1, further comprising a connection member having one side connected to the display module.

16. The display apparatus of claim 15, wherein the cover sheet covers one side of the connection member.

17. The display apparatus of claim 15, wherein the display module comprises a display panel and a touch panel on the display panel, and
one side of the connection member is connected to the touch panel.

* * * * *